(12) United States Patent
Reussner

(10) Patent No.: US 12,492,862 B2
(45) Date of Patent: Dec. 9, 2025

(54) DEVICE FOR CHILLING OR FROSTING GLASSES

(71) Applicant: Michael Reussner, Traun (AT)

(72) Inventor: Michael Reussner, Traun (AT)

( * ) Notice: Subject to any disclaimer, the term of this patent is extended or adjusted under 35 U.S.C. 154(b) by 267 days.

(21) Appl. No.: 18/018,489

(22) PCT Filed: Jul. 29, 2021

(86) PCT No.: PCT/AT2021/060262
§ 371 (c)(1),
(2) Date: Jan. 27, 2023

(87) PCT Pub. No.: WO2022/020873
PCT Pub. Date: Feb. 3, 2022

(65) Prior Publication Data
US 2023/0296312 A1 Sep. 21, 2023

(30) Foreign Application Priority Data

Jul. 30, 2020 (AT) .................................. 50648/2020
Feb. 12, 2021 (AT) .................................. 60041/2021
(Continued)

(51) Int. Cl.
*F25B 19/02* (2006.01)
*F25B 19/00* (2006.01)
*F25D 31/00* (2006.01)

(52) U.S. Cl.
CPC .......... *F25D 31/008* (2013.01); *F25B 19/005* (2013.01); *F25B 19/02* (2013.01); *F25D 2331/808* (2013.01)

(58) Field of Classification Search
CPC .... F25D 3/14; F25D 31/008; F25D 2331/808; F25B 19/005; F25B 19/02
See application file for complete search history.

(56) References Cited

U.S. PATENT DOCUMENTS

| | | | | |
|---|---|---|---|---|
| 3,602,008 A | * | 8/1971 | Kelley | F25D 31/008 251/156 |
| 3,668,888 A | * | 6/1972 | Roslonski | F25D 7/00 251/156 |
| 8,176,745 B1 | * | 5/2012 | Korza | F25D 31/008 62/258 |

FOREIGN PATENT DOCUMENTS

| | | |
|---|---|---|
| EP | 1568956 A1 | 8/2005 |
| ES | 8609681 A1 | 7/1986 |

(Continued)

OTHER PUBLICATIONS

International Search Report and Written Opinion in International Application No. PCT/AT2021/060262, mailed Jan. 27, 2022, 23 pages.
(Continued)

*Primary Examiner* — Jerry-Daryl Fletcher
*Assistant Examiner* — Daniel C Comings
(74) *Attorney, Agent, or Firm* — Liang & Hennessey LLP; Brian Hennessey

(57) ABSTRACT

A device for cooling or freezing glasses with carbon dioxide, having an upwardly open inner space for receiving a glass, wherein the inner space is enclosed all around by an inner wall, wherein a nozzle and a support tray are arranged in the inner space and a glass to be cooled or frozen is movable into the inner space and against the support tray from above, whereby carbon dioxide is released into the glass from the nozzle, and wherein the device has an outer wall, wherein the inner wall has openings leading into the device interior between the inner wall and the outer wall, and/or the inner wall is open towards the device interior beneath the support tray or is sealed with an inner bottom element which has multiple openings leading into the device interior. Optional elements allow fastening the device directly to the valve cap of a gas cylinder.

20 Claims, 11 Drawing Sheets

(30) Foreign Application Priority Data

Apr. 29, 2021 (AT) .................................. 60124/2021
Jun. 21, 2021 (AT) .................................. 60174/2021

(56) References Cited

FOREIGN PATENT DOCUMENTS

| KR | 101839076 B1 | 3/2018 | | |
|----|----|----|----|----|
| WO | WO-2009142486 A1 | * | 11/2009 | ........... F25D 31/008 |
| WO | WO-2016084108 A1 | * | 6/2016 | ............... A61L 2/22 |

OTHER PUBLICATIONS

PGA Informatica, "Rodagases", Retrieved from the Internet, https://web.archive.org/web/20150218022652/http://rodagases.es/rdicecube.html, Feb. 18, 2015.

* cited by examiner

DEVICE FOR CHILLING OR FROSTING GLASSES

CROSS-REFERENCE TO RELATED APPLICATIONS

The present application is a national phase application of PCT Application No. PCT/AT2021/060262, filed Jul. 29, 2021, entitled "DEVICE FOR REFRIGERATING OR FREEZING GLASSES", which claims the benefit of Austrian Patent Application No. A 50648/2020, filed Jul. 30, 2020, Austrian Patent Application No. A 60041/2021, filed Feb. 12, 2021, Austrian Patent Application No. A 60124/2021, filed Apr. 29, 2021, and Austrian Patent Application No. A 60174/2021, filed Jun. 21, 2021, each of which is incorporated by reference in its entirety.

BACKGROUND OF THE INVENTION

1. Field of the Invention

The invention relates to a device for cooling or freezing glasses with carbon dioxide ($CO_2$).

2. Description of the Related Art

Devices for cooling and/or freezing glasses are known in the prior art in many variant embodiments.

From EP 1568956 A1 is known, for example, a device for cooling and/or freezing glasses which differs from the above design in that it has an annular nozzle which is present outside the glass. The arrangement of the annular nozzle surrounding the glass requires a different structure of the device as compared to devices of the above design.

WO 2016084108 A1 shows a device of the above design. The nozzle is surrounded by a support plate. Once a glass is pressed against the support plate (floral depiction), $CO_2$ flows inside the glass from the nozzle. Due to openings in the support plate, the $CO_2$ moves downward from the glass interior through said openings and ascends again outside between the closed inner wall of the device and the glass.

U.S. Pat. Nos. 3,668,888 A and 3,602,008 A show similar devices working in the same manner. The apparatus of U.S. Pat. No. 3,602,008 A is permanently built into a housing, which laterally surrounds a gas cylinder.

These devices are advantageous in that they are easy to use and allow quick cooling and/or freezing of glasses with one hand. The formation of dry ice at the nozzle may pose a problem because the dry ice descends and accumulates on or beneath the support plate. A substantial drawback of these devices is the heavy noise development, which might be desired in some bars for reasons of atmosphere but is typically regarded as a disturbance in more high-end places.

SUMMARY OF THE INVENTION

The task underlying the invention is to provide a device for cooling glasses of the above design, which is improved with respect to the known devices for cooling glasses of the above design. Devices and apparatuses are proposed to solve said task according to the enclosed claims.

It has been found that improvements on the prior art can be made by providing openings that run into the device interior. Such openings may lead into a cavity between the inner wall and the outer wall through the inner wall of the housing and/or into a container beneath the support tray through the support tray and/or between support tray and central nozzle.

The openings make it possible that carbon dioxide exiting at the nozzle, which may comprise a fraction of snow-like carbon dioxide, and/or the sound resulting from said exit are diverted into the device interior, so that less snow-like carbon dioxide and/or less sound get outside. This reduces the device's emissions (in the way of snow-like carbon dioxide and/or sound) in a manner advantageous over prior art.

In particular, proposed is a device for cooling or freezing glasses with carbon dioxide, having an upwardly open inner space for receiving a glass, wherein the inner space is enclosed all around by an inner wall, wherein a nozzle and a support tray are arranged in the inner space and a glass to be cooled or frozen is movable into the inner space and against the support tray from above, whereby carbon dioxide is released into the glass from the nozzle, and wherein the device has an outer wall,
  wherein the inner wall has openings leading into the device interior between the inner wall and the outer wall, and/or
  the inner wall is open towards the device interior beneath the support tray or is sealed with an inner bottom element which has multiple openings leading into the device interior.

Preferably, the device has the features of both variant embodiments.

In the variant embodiment in which the inner wall is open towards the device interior beneath the support tray or is sealed with an inner bottom element which has multiple openings leading into the device interior, it is preferred that a container is arranged beneath the support tray in the device interior, wherein dry ice developing at the nozzle descends into the container through openings of the support tray or through openings between the support tray and the nozzle. The container is preferably accessible or removable through an opening that is laterally present in the outer wall.

In the variant embodiment in which the inner wall has openings leading into the device interior between the inner wall and the outer wall, it is preferred that a sound-absorbing material is present in the cavity between the inner wall and the outer wall, and the openings lead from the inner wall of the inner space to the sound-absorbing material.

In one variant embodiment, the openings of the inner wall can be present beneath the outer rim of the support tray.

In one variant embodiment, the openings of the inner wall can be present above the outer rim of the support tray.

In one variant embodiment, the openings of the inner wall can be present both beneath the outer rim of the support tray and above the outer rim of the support tray.

Instead of a support plate with openings or a support grid as known for the devices of this design, a support tray without openings in the area of the wall of the glass is preferably used. Preferably, the support tray has a central opening for passage of the nozzle. Preferably, the support tray has multiple openings present around the central opening for passage of the nozzle, which openings are within the wall of a usable glass. Said multiple openings are preferably present entirely within half the radius of the support tray.

Another improvement over prior art, which may be provided along with or independently of the other variant embodiments described herein, is a device for cooling or freezing glasses with carbon dioxide, wherein the device has at least one fastening element on its lower end, with which the device is detachably mountable to the valve cap of a gas cylinder, wherein the fastening element is present at the housing of the device or at an intermediate element which is detachably connected to the housing of the device.

It is preferred that at least one fastening element is selected from the group of fastening elements comprising: clamping element encompassing an upper periphery of the valve cap; belt; strap; buckle; string; screw; bolt; thread; protrusions or recesses of a bayonet mount; recess for receiving the upper rim of the valve cap.

In one variant embodiment, proposed is an apparatus comprising a device for cooling or freezing glasses with carbon dioxide, a gas cylinder and a valve cap fastened to the gas cylinder, wherein the device for cooling or freezing glasses is detachably fastened to the valve cap.

In one variant embodiment, proposed is an apparatus comprising a device for cooling or freezing glasses with carbon dioxide and a draining element, wherein the device for cooling or freezing glasses stands at the draining element, wherein the draining element has on its outer circumference or in its outer periphery an outer web and a recess is present between the housing of the device and the outer web.

It is preferred that the draining element has a second, inner web spaced apart from, and higher than, said outer web.

It is preferred that the draining element has two inner webs, between which a gap for receiving a section of the outer wall of the device is present.

In one variant embodiment, it is proposed that a battery pack for the device is present in or at an intermediate element or in, at or beneath a draining element.

In one variant embodiment, proposed is a device for cooling or freezing glasses with carbon dioxide, having an upwardly open inner space for receiving a glass, wherein the inner space is enclosed all around by an inner wall, wherein a nozzle and a support tray are arranged in the inner space and a glass to be cooled or frozen is movable into the inner space and against the support tray from above, whereby carbon dioxide is released into the glass from the nozzle, wherein at least one sealing element, which at least partially seals the inner space upwardly, is present at the upper end region of the inner space or above the inner space.

It is preferred that the seal is formed by a plurality of flexible elements, which extend from the inner wall towards the center of the inner space.

In a preferred variant embodiment, it is proposed that the support tray has a funnel-shaped support area for the glass and dry ice developing at the nozzle can get down into the device interior through openings, which are present between the funnel-shaped support area of the support tray and the nozzle.

Preferably, it is proposed as an improvement that a removable drawer is arranged beneath the support tray, wherein dry ice developing at the nozzle descends into the drawer through openings of the support tray. The drawer is also advantageous in case foreign matter or liquids get inside the device.

Preferably, the distance between the upper rim of the inner space and the upper surface of the support tray is at least 5 cm.

Preferably, a cavity is present between inner wall and outer wall.

Preferably, a sound-absorbing material is present in said cavity.

A preferred variant provides that the inner wall be provided with openings leading into the cavity between inner wall and outer wall from the inner space.

A preferred variant provides that the support tray be formed out of elastic material, in particular silicone, or have a surface or support made of elastic material, in particular silicone.

One variant provides that the inner wall be sealed beneath the support tray by an inner bottom element having a passage opening for a component carrying the support tray and the nozzle or an assembly carrying the support tray and the nozzle.

One variant provides that the inner wall and the inner bottom element be inseparably connected, i.e., preferably glued or welded together or monolithically connected. In one variant, the inner wall and the inner bottom element are present integrally as a cup-like element, in particular as a hollow cylinder sealed on one side.

In a preferred variant embodiment having a drawer in the device, it is provided that the inner bottom element be provided with openings for the passage of dry ice.

A preferred variant provides that the outer wall be sealed by a lower bottom element, which is detachably connected to the outer wall.

A preferred variant provides that the outer wall and the inner wall be undetachably connected, in particular glued or welded together or monolithically connected, at the upper end of the device.

A preferred variant provides that the device has a sensor which detects pressing a glass against the support tray, or has a switch or button which is actuated when pressing a glass against the support tray, wherein the device has a valve for releasing carbon dioxide via the nozzle which is opened based on a signal of the sensor or based on the actuation of the switch or button.

A preferred variant provides that the distance between inner wall and outer wall in the cavity is at least 2 cm, in particular at least 4 cm, on the level of the support tray.

A preferred variant provides that the nozzle is formed out of ceramic or plastic.

The nozzle and the support tray are set off inside the device. Preferably, the upper rim of the container wall has a distance from the nozzle of at least 3 cm, in particular at least 7 cm. Preferably, the upper rim of the container wall has a distance from the support tray of at least 5 cm, in particular at least 7 cm. In the case of the funnel-shaped support tray, the lower rim of the funnel-shaped support area has a distance from the upper rim of the container wall of at least 5 cm, in particular at least 7 cm. The container wall surrounding the nozzle and adjoining it upwardly is made to be double-walled, wherein preferably, a sound-absorbing material is arranged in the area between the inner container wall, i.e., the inner wall, and the outer container wall, i.e., the outer wall.

The sound-absorbing material is preferably a foam, particularly preferably foam rubber, in particular sponge rubber. The sound-absorbing material is preferably open-pored.

The cavity, i.e., gap, between inner wall and outer wall on the level of the support tray is at least 2 cm, in particular at least 4 cm. The cavity, i.e., gap, between inner wall and outer wall extends from the lower end of the inner wall to the upper rim of the device, wherein the cavity is sealed by a connection of inner wall and outer wall on the upper end of the device. The sound-absorbing material can be present in the entire cavity or only in a partial area or several partial areas of the cavity.

The inner container wall is preferably provided with openings, through which the sound-absorbing material is exposed. The sound-absorbing material can extend into openings of the inner wall.

The inner container wall is preferably formed out of plastic. The outer container wall is preferably formed out of plastic.

In one variant embodiment, the inner container wall and the outer container wall are present as an integral component. In one variant embodiment, the inner container wall and the outer container wall are glued or welded together. In one variant embodiment, the inner container wall and the outer container wall are connected via a ring, which forms the upper rim of the device.

Preferably, the inner container wall is made to be cylindrical.

Preferably, the inner container wall offers space for exactly one glass.

Preferably, the inner container wall has an inner diameter ranging from 10 to 20 cm, particularly preferably ranging from 13 to 17 cm.

Preferably, the upper rim of the container wall has a distance from the support tray of at least 6 cm, in particular at least 8 cm.

Preferably, the support tray has a small distance from the inner container wall, preferably ranging from 1 to 10 mm.

The inner container wall surrounds the support tray on all sides, i.e., all around.

Preferably, the support tray has a surface out of elastic material, in particular silicon. The support tray can comprise a support out of elastic material on a structural component. The support tray can comprise a structural component having a cover or coating out of elastic material. The support tray can be entirely formed out of elastic material.

The support tray and/or the elastic material can have a rough or textured surface, so that the formation of excess pressure in the glass can be reduced.

If the support tray and/or the elastic material is smooth and a sealing effect with respect to the rim of the glass results, excess pressure in the glass is reduced by gas escaping between the nozzle and the support tray. In one variant embodiment, an additional channel is provided in the nozzle, an element adjoining the support tray beneath the nozzle or the support tray, which channel is open beneath the support tray or in the space between inner wall and outer wall of the device. The channel may also run to the outer side of the device. The channel may be filled or sealed on its end with an open-pored, sound-absorbing material.

In one variant embodiment, it may be provided that, when a glass is pressed against the support tray, a valve for $CO_2$ be opened for a period of time which is independent of the period of time of pressing the glass. For this, an electronic circuit may be provided, which opens a nozzle upon initial pressing of the glass and is closed again after a predefined or adjustable period or based on a sensor signal, in particular of a temperature sensor, optical sensor or pressure sensor measuring the internal pressure in the glass.

Preferably, the device is actuated by pressing a glass against the support tray. The $CO_2$ release may be by mechanics actuated by pressing downward. The release may be by a magnetic switch or another electrical, electronic or electromechanical component actuated upon downward movement. The release may be triggered by a sensor which detects pressure on the support tray. The release may be triggered by a sensor which detects the downward movement of the support tray.

Less preferably, the $CO_2$ release may be based on a sensor which detects the presence of a glass in the inner space of the device or on the support tray, for example, an optical sensor.

Less preferably, a switch, button or proximity sensor effecting the $CO_2$ release may be present on the outside of the device.

The nozzle is located centrally in the inner space of the device and centrally on the support tray. In the above prior-art design, the nozzle is formed out of metal, in particular stainless steel. In the subject device, the nozzle is preferably formed out of a non-metal.

In one variant embodiment, the nozzle is formed out of plastic. In a further variant embodiment, the nozzle is formed out of ceramics.

In a less preferred variant embodiment, the inner wall is sealed on its lower end by an inner bottom plate, which forms a central passage opening for the assembly receiving the nozzle and the support tray. The mechanics and/or electronics for releasing $CO_2$ through the nozzle are arranged beneath said bottom plate.

The outer wall has on its lower end an opening through which the mechanics and/or electronics may be mounted and made accessible. The opening is sealed by an outer bottom plate, which may be made to be removable. The outer bottom plate may be screwed to the outer wall. The mechanics and/or electronics for releasing $CO_2$ are preferably attached to the inner bottom plate or an inner housing.

A passage or port for a $CO_2$ line is provided at the outer wall. A passage or port for power supply is preferably provided at the outer wall. A main switch for the electrical components of the device is preferably provided at the outer wall, $CO_2$ release being only possible when the main switch is activated.

In one variant embodiment, it is provided that the sensor or switch and the valve be separated by a screen.

In one variant embodiment, it is provided that the container is accessible beneath the support tray by a sealable opening of the outer wall which is present beneath the support tray on the outer wall of the housing. To close the sealable opening, a flap or door having a hinge joint may be present on the outer wall, or a slider may be present, which is slidable along the outer wall.

In one variant embodiment, it is provided that the container beneath the support tray be present as a drawer, which can be removed laterally from the housing of the device beneath the support tray.

In one variant embodiment, it is provided that the device has an inner housing in which the valve and the switch are arranged, wherein the inner housing comprises a roof and a wall, wherein the roof has a roof protrusion with respect to the wall and wherein part of a container wall of the completely inserted drawer lies beneath the roof protrusion of the inner housing.

In one variant embodiment, it is provided that the drawer has two areas laterally encompassing the inner housing and the drawer can be laterally removed from and reinserted into the device through an opening of the outer wall.

BRIEF DESCRIPTION OF THE DRAWINGS

Preferred variants of the invention are illustrated by way of example based on drawings.

DETAILED DESCRIPTION

The scope of protection is defined by the claims. In the description of the figures, possible embodiments are merely discussed based on the figures, wherein the invention is by no means limited to the embodiments discussed. A person of skill will be particularly able to combine the teaching of the above general part with the description of the figures or the description of individual figures with each other.

Figure 1:
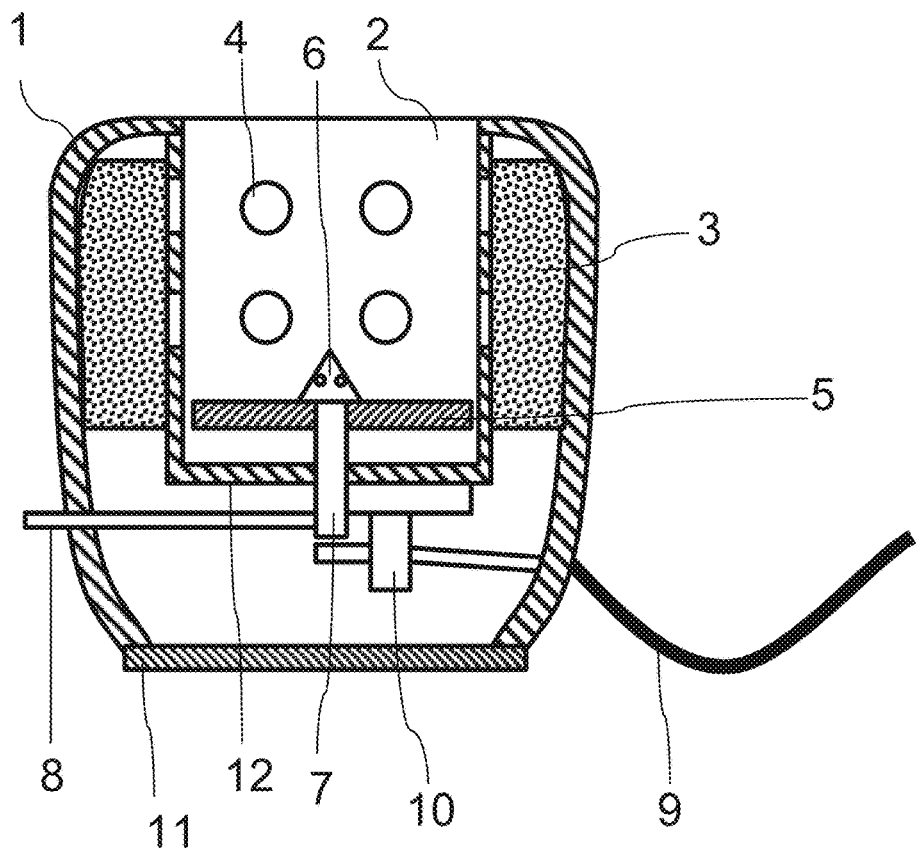
FIG. 1: illustrates schematically a first variant embodiment in a sectional view.
Figure 2:
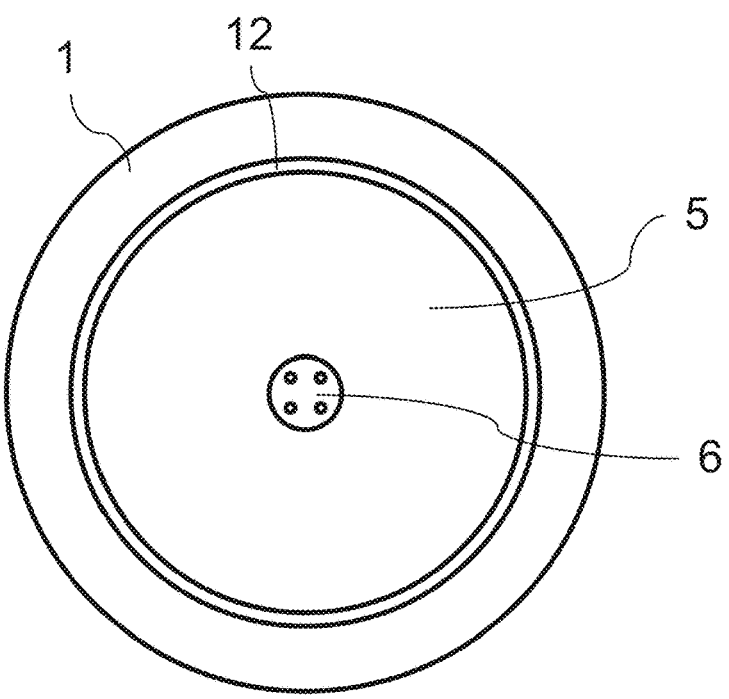
FIG. 2: illustrates schematically a first variant embodiment in a top view.

FIGS. 1 and 2 show one and the same example device for cooling and/or freezing glasses with $CO_2$ of a first variant embodiment. The device comprises an outer wall 1 and an inner wall 2. The inner wall 2 surrounds the inner space of the device, which is able to receive exactly one glass to be cooled. A cavity is enclosed between the outer wall 1 and the inner wall 2, in which a sound-absorbing material 3 is present. The inner wall 2 has openings 4, which lead from the inner space of the device to the sound-absorbing material 3, i.e., to the cavity. In the variant embodiment without a drawer for dry ice, the inner wall 2 is sealed on its bottom end by an inner bottom element 12.

A support tray 5 and a nozzle 6 are present in the inner space. The nozzle 6 is preferably present centrally on and above the support tray 5. The bottom outer circumference of the nozzle 6 facing the support tray 5 may be larger than the outer circumference of the opening of the support tray 5, as depicted. The nozzle 6 and the support tray 5 are present on a component or assembly 7. The component or assembly 7 runs through the inner bottom element 12 of the inner wall 2.

The device has a port or passage for a feed line 8 of the carbon dioxide. The carbon dioxide is guided to the assembly 7 in the device and up to the nozzle through a tube or pipeline. Preferably, the device has an electrically actuated valve which exposes the path of the carbon dioxide to the nozzle upon actuation. In an electricity-free state, the valve is closed. Actuation of the valve is preferably done by pressing down the support tray. Pressing down the support tray 5 is detected by a sensor—for example, a pressure sensor, movement sensor or distance sensor—or the pressing down actuates a switch 10—in particular a magnetic switch—or button. The device can further comprise electronics, for example, for automatic deactivation (by closing the valve) after a predefined or adjustable period or based on a sensor signal, in particular of a temperature sensor or optical sensor. Furthermore, the device has a power cable 9 or is equipped with a battery pack or battery.

A purely mechanical execution of the device is less preferable, but also possible; in this case, a valve is opened by pressing down the support tray. A such mechanically actuated valve can be equipped with an electronic safety switch, which closes the valve or an additional valve in a state of fault or after a predefined or adjustable period.

The outer wall 1 is sealed on its bottom end by an outer, i.e., lower, bottom element 11, which is preferably detachably attached, in particular screwed, to the outer wall. A stopcock may be arranged on the device or on the feed line in case the $CO_2$ storage, in particular a $CO_2$ cylinder, is arranged far away from the device or does not itself have a stopcock. An electric switch or device switch may be arranged on the device or the power cable 9, wherein switching off preferably causes a valve of the $CO_2$ line to close.

Figure 3:
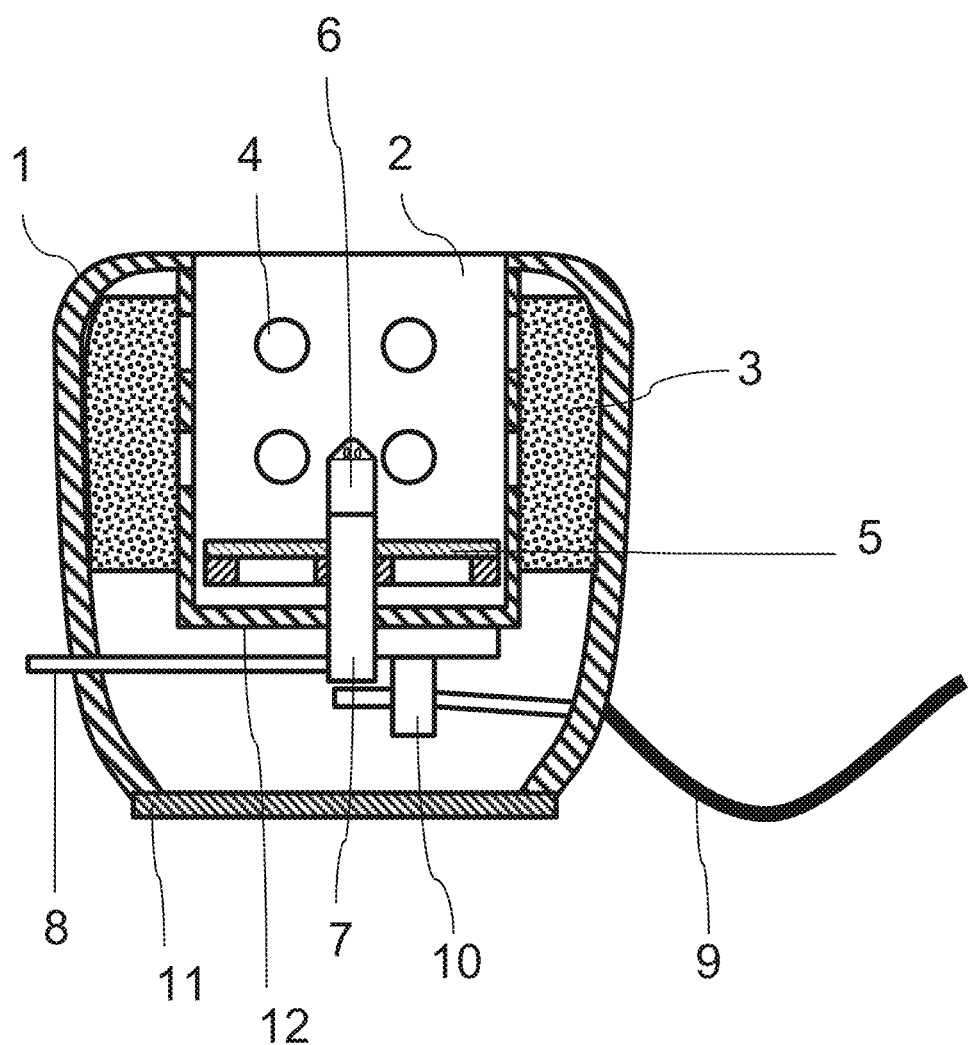
FIG. 3: illustrates by way of example variants of the nozzle and the support tray.

FIG. 3 illustrates a further variant of the support tray 5. The support tray 5 is formed by a support out of elastic material—in particular silicone—present on a perforated support plate or support grid—or, not shown, a non-perforated support plate. The nozzle 6 is made to be rod-shaped and is present as an extension of the element receiving the nozzle 6. The nozzle 6 can be present in a circumference which is equal to or smaller than the circumference of the opening of the support tray 5. The nozzle 6 or the support tray 5 of FIG. 3 can also find use in the variant embodiment of FIGS. 1 and 2 and vice versa, so the nozzle 6 or support tray 5 described for one figure may replace the nozzle 6 or support tray 5 of the other figure.

FIGS. 4 through 10 show a second exemplary variant of the device, which variant embodiment differs from the previously described variants mainly in having a drawer 13.

The drawer 13 serves to capture dry ice (in the shape of snow-like carbon dioxide) which is formed when the carbon dioxide flows out of the nozzle 6. The drawer 13 can be removed from the device such that the dry ice can be disposed of or used for other purposes.

In this variant, the inner wall 2 has no inner bottom element 12 but is downwardly open. Alternatively, an inner bottom element 12 may be present, which has openings for the passage of dry ice.

When using the device at a bar, the drawer 13 is intended to face the barkeeper and thus away from the customers.

The housing of the device is composed of multiple elements. It comprises an outer wall 1, which is preferably inseparably connected, in particular glued or welded, to the inner wall 2. As shown, the inner wall 1 has on its upper end a widened area into which a downwardly oriented inner area of the outer housing part having the outer wall 1 protrudes. The outer wall 1 is connected on its lower end to a lower bottom element 11, which is placed in the lower opening of the outer wall 1. Lugs or brackets are preferably glued or welded to the inside of the outer wall 1, wherein said lugs are used for screwing to the lower bottom element 11. For this, threads may be provided on the lugs or brackets, for example, by placing plug-in nuts, locking nuts or riveted nuts. Less preferably, threads could be cut into the material of the lugs or brackets. As can be seen from FIGS. 8 and 9, attachment may be via a singular fastening bracket 19 which runs in a circular bow shape on the inside of the outer wall 1 and is open on the side of the aperture of the drawer 13. The outer wall 1 is not shown in FIGS. 8 and 9. The lower bottom element 11 has a widened upper rim 20 corresponding to the fastening bracket 19. As can be seen from FIG. 9, the upper rim 20 and/or the area of a perpendicular wall section of the bottom element 11 adjoining beneath it has an opening which serves for at least one line to pass through. Said opening preferably lies on the open end of the inner housing 14.

An inner housing 14 is located beneath the support tray, into which inner housing 14 the assembly 7, i.e., the element receiving the support tray 5 and the nozzle 6 protrudes. The inner housing 14 preferably occupies an approximately arcuate area of the inner space of the device, which arc is preferably smaller than 180 degrees. The inner housing 14 is preferably open on its rear side that faces the outer wall 1, so that the components located in the inner housing 14 are accessible upon removal of the outer housing. Above said rear opening face, the inner housing 14 preferably has a free-standing wall protruding upwards, which is present further outside than the inner wall 2 and prevents dry ice from reaching the opening of the inner housing 14. The lower lateral corners of this wall of the inner housing 14 lie within the rear walls of the drawer 13 that adjoin the inner housing 14 on both sides when the drawer 13 is completely inserted.

A switch 10 and a valve 15 are located in the inner housing 14. As can be seen from FIG. 9, the switch 10 is actuated, preferably mechanically, when moving the support tray 5 down, wherein it, i.e., the electric flow through the closed switch 10, opens the valve 15, in particular the magnetic valve. The valve 15 is received in an additional housing part, a screen 16, which screens it off at least in the direction of the switch 10. Since cooling of the valve 15 occurs in operation, this prevents, or reduces, the transfer of cold to the switch 10. This prevents atmospheric humidity from condensing and congealing on the switch 10. As shown, the screen 16 may be downwardly open. As shown, the screen 16 may be rearwardly open. Preferably, the screen 16 is upwardly closed. Preferably, the screen 16 is laterally closed towards both of the sides. The switch 10 is preferably attached to the inner housing 14 beneath, i.e., inside the roof of the inner housing 14.

The inner housing 14 has on its upper end a roof with oblique side faces, which are executed with a protrusion with respect to the circumferential wall of the inner housing 14. As can be well seen from FIG. 4, the container wall of the completely inserted drawer 13 comes to lie beneath the roof protrusion of the inner housing 14. The drawer 13 is made to be approximately U-shaped. The drawer 13 has two areas laterally encompassing the inner housing 14, as can be best seen from FIG. 7. On its other end, the drawer 13 preferably has an aperture on the lower end of which a depression for gripping is present.

In a variant embodiment not shown, it may be provided that a container having the shape and/or the elements of the previously described drawer be firmly mounted or provided in the device and the aperture be pivotable or slidable to make the container accessible from the outside, preferably laterally beneath the support tray, through the outer wall 1.

Figure 10:
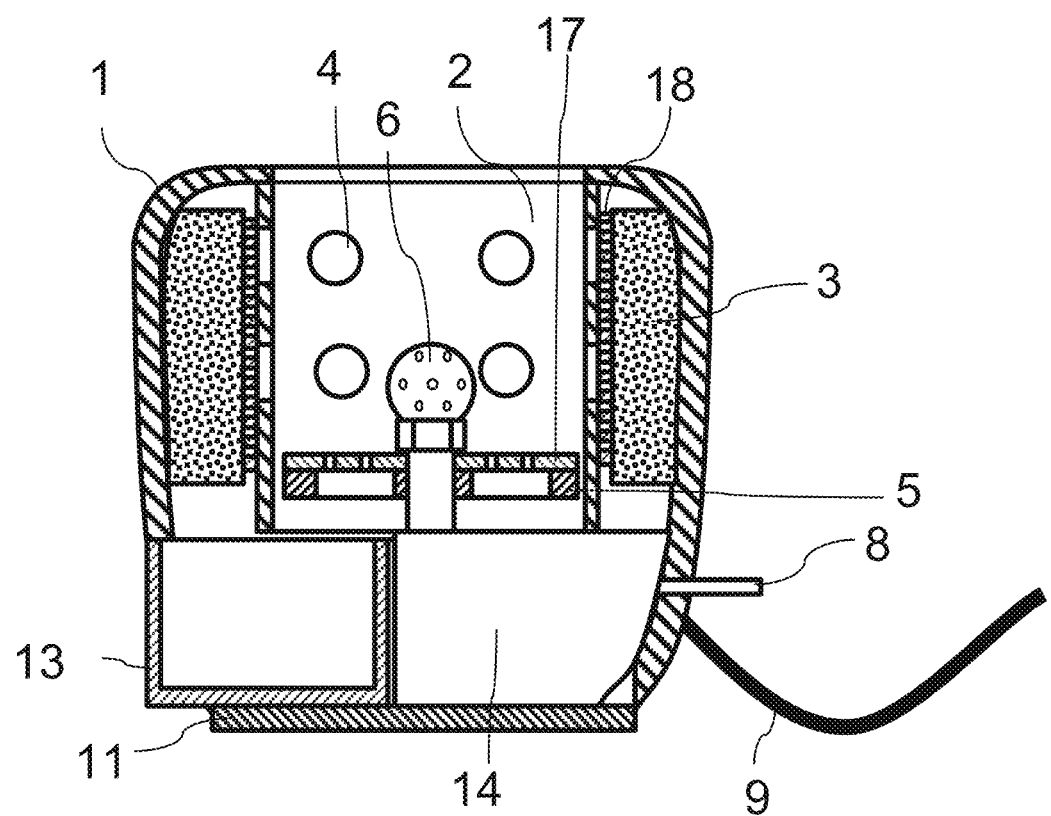
FIG. 10: illustrates schematically a further variant embodiment in a lateral sectional view.

FIG. 10 schematically shows the design according to the second variant embodiment, illustrating two further optional details. As illustrated, the nozzle 6 can be present in a spherical shape, wherein the sphere preferably has a downwardly protruding connecting part, which serves to connect to the assembly 7, beneath its equator (horizontal center). As shown, the connecting part may be present as a hex. Preferably, the sphere has multiple holes for carbon dioxide to exit, wherein it is preferred if holes are present both above and beneath the equator. A series of holes may also be present exactly on the equator.

FIG. 10 also illustrates an optional perforated sleeve 18, which is located inside the housing, adjoining the inner wall 2. The perforated sleeve 18 has openings which are smaller and present in a larger number than the openings 4 of the inner wall 2. It is assumed that this results in additional noise reduction. In any case, the insulation material 3 is protected from mechanical damage. The sleeve 18 may preferably be present as a perforated plastic, perforated sheet metal, mesh or wire mesh.

Figure 6:
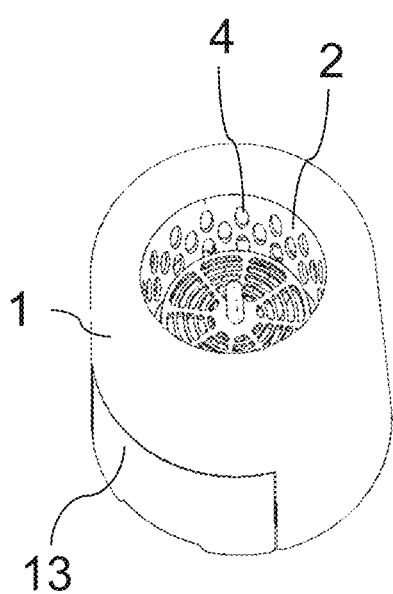
FIG. 6: shows the second variant embodiment in an oblique top view.
Figure 7:
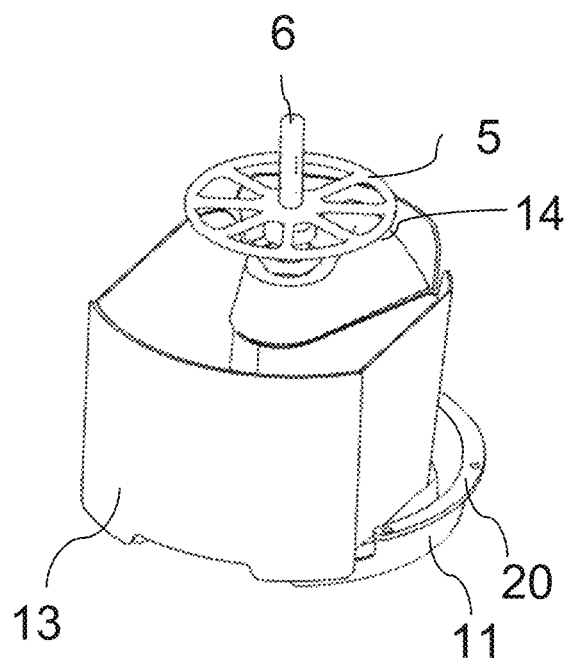
FIG. 7: shows selected components of the second variant embodiment in an oblique top view.
Figure 8:
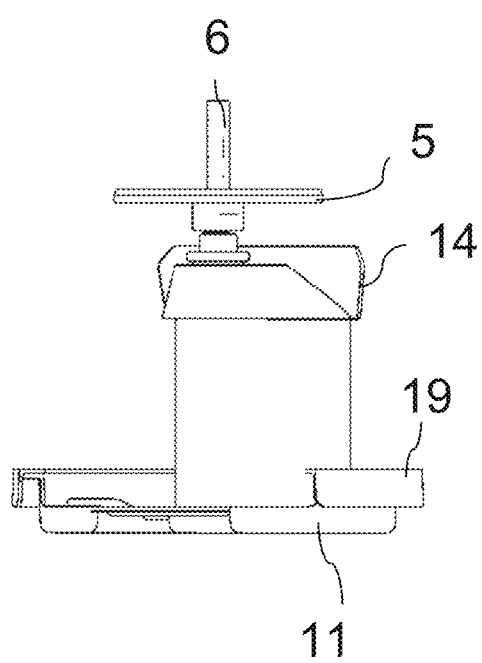
FIG. 8: shows selected components of the second variant embodiment in a lateral view.
Figure 9:
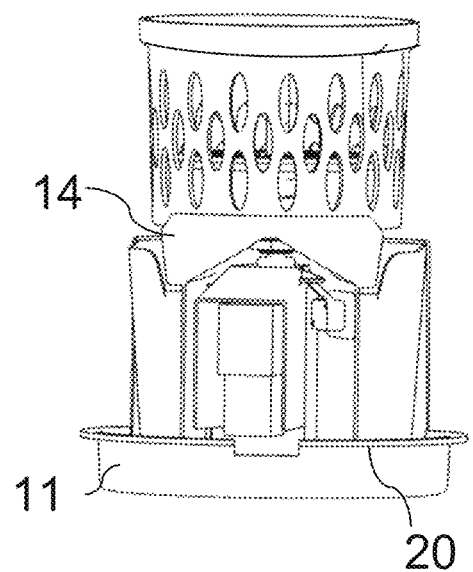
FIG. 9: shows selected components of the second variant embodiment in a lateral view.

FIG. 6 also shows a first variant embodiment of a silicone support 17 present on the support tray 5. The silicone support 17 has multiple slots, each running circumferentially, which are present in parallel on circles with ascending diameters. Multiple slots present on one circle are separated by webs.

Figure 4:
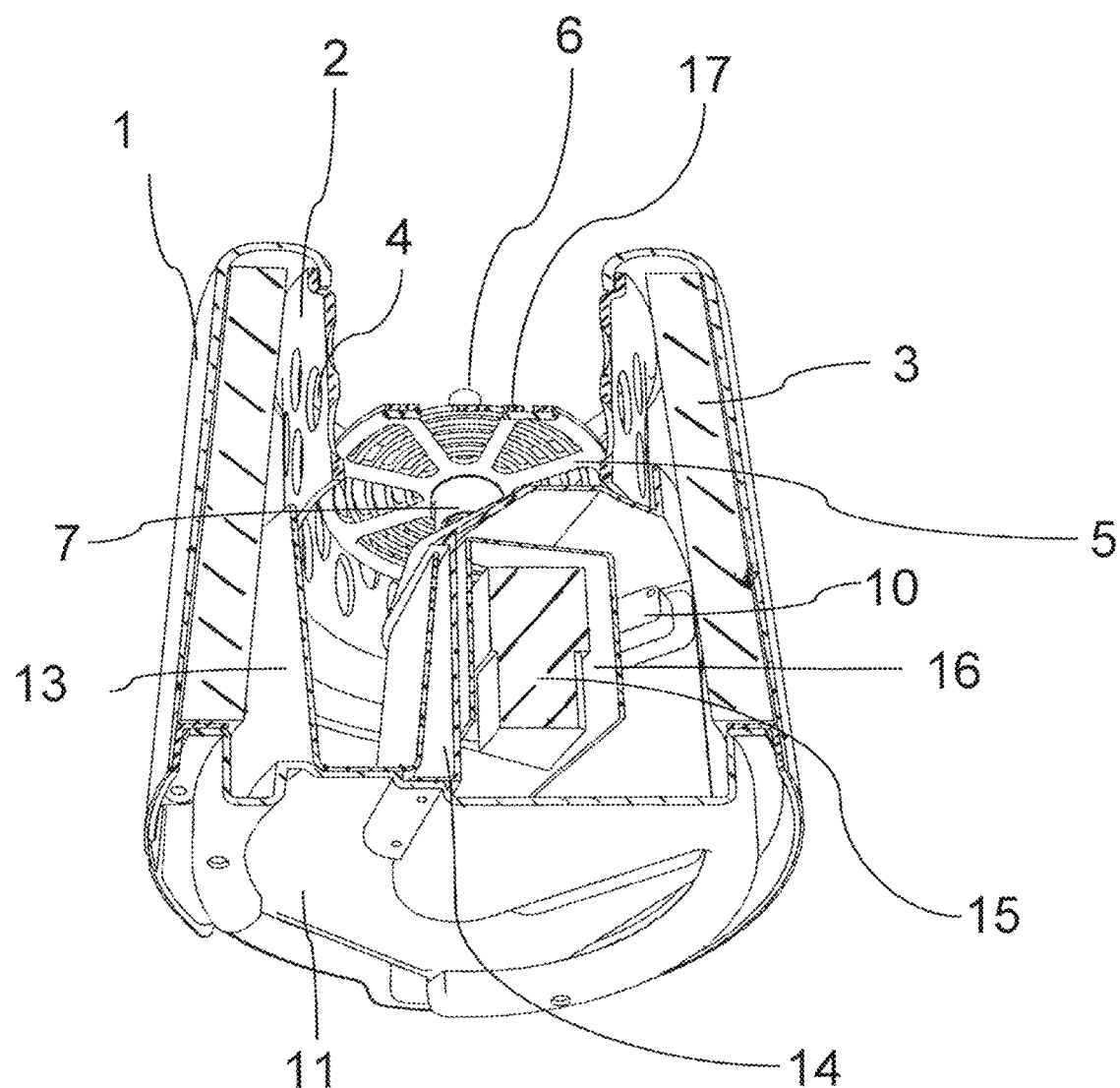
FIG. 4: shows a second variant embodiment in a perspective sectional oblique bottom view.

The support tray 5 is also provided with openings, for example, by having an outer ring connected to an inner ring by radial rods as can be seen from FIG. 4.

As illustrated in FIG. 10, the silicone support 17 may also have other openings, for example in the shape of circular holes.

As illustrated in FIG. 10, the sound-absorbing material 3 surrounds the inner wall 2 completely and preferably abuts it directly or the optional perforated sleeve 18.

Figure 5:
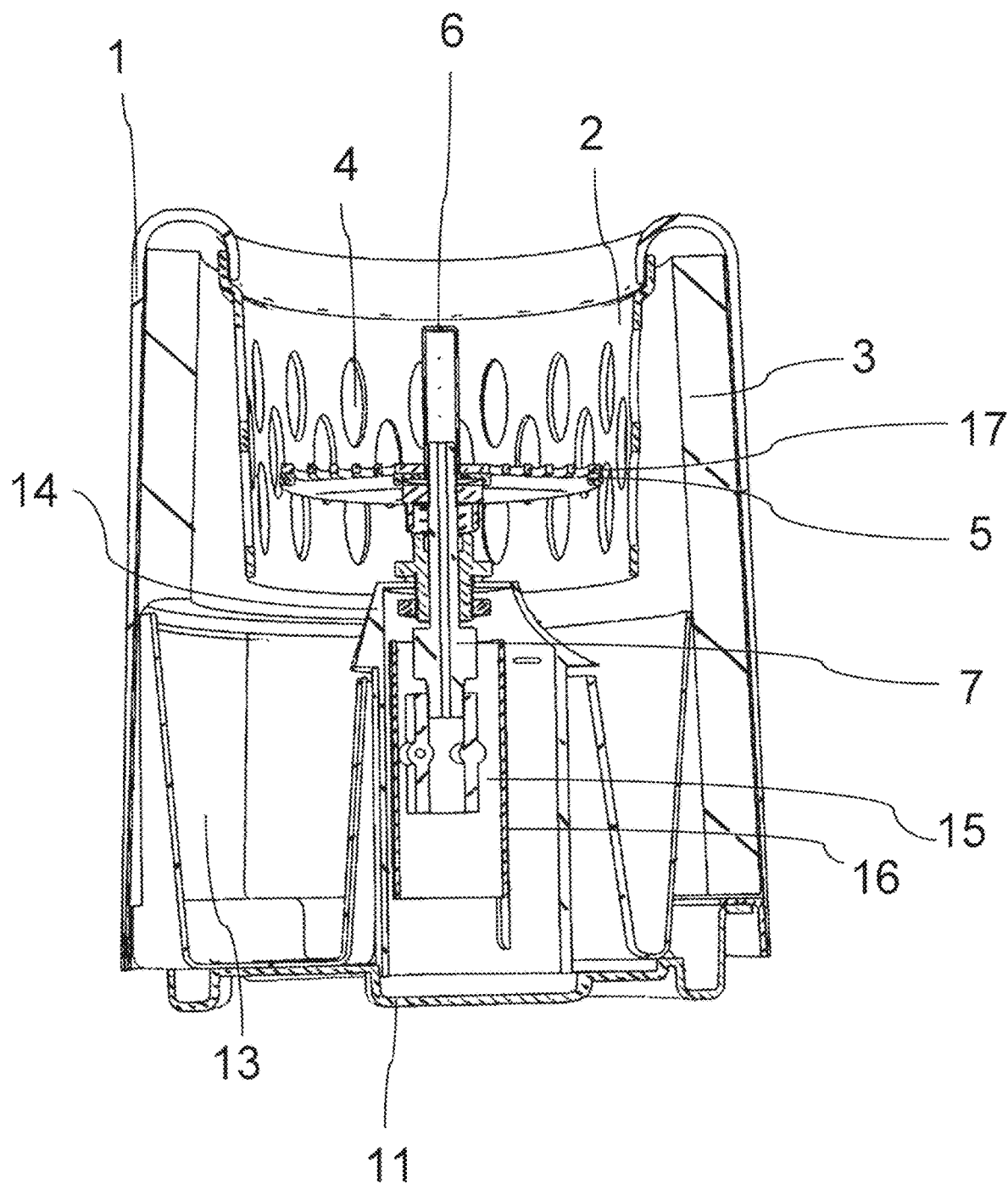
FIG. 5: shows the second variant embodiment in a further perspective sectional view.

As illustrated in FIGS. 4 and 5, a gap may also be present between the sound-absorbing material 3 and the inner wall 2. A second element out of sound-absorbing material 3 may optionally be inserted into the gap to be seen from FIGS. 4 and 5. The sound-absorbing material 3 of the variant of FIGS. 4 and 5 abuts the outer wall 1 and may extend down to the fastening bracket 19. The outer wall 1 and the sound-absorbing material 3 have an exposure in the area of the drawer 13. Preferably, the sound-absorbing material 3 also extends across the area of the rear opening of the inner housing 14, so that the components in the inner housing 14 are accessible upon removal of the outer housing (comprising inner wall 2 and outer wall 1) and the sound-absorbing material 3. The sound-absorbing material 3 may preferably be present loose or separable in the outer housing, so that it may be replaced if necessary.

Since it may be required to replace the sound-absorbing material 3 in case of contamination or in regular intervals, one variant provides providing it for sale as a commodity.

Figure 12:
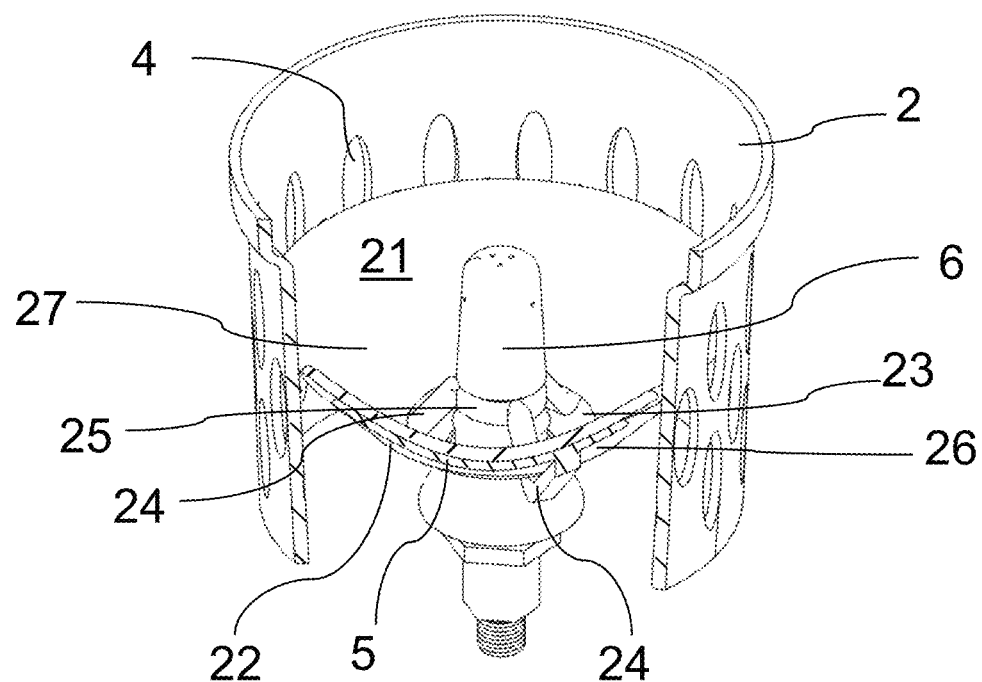
FIG. 12: illustrates a further variant embodiment having a funnel-shaped support area of the support tray in a sectional view.
Figure 13:
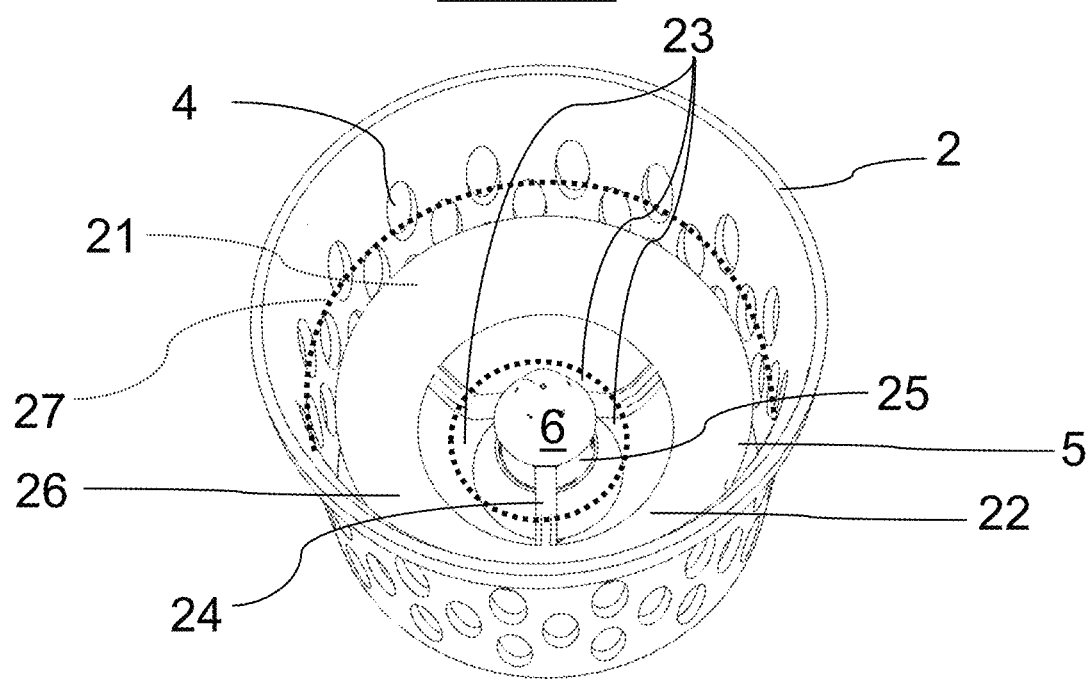
FIG. 13: illustrates the further variant embodiment having a funnel-shaped support area in a second view.

FIGS. 12 and 13 illustrate a particularly preferred variant embodiment of the support tray 5 or a support element. As shown, it is preferably made to be funnel-shaped, with inwardly decreasing flanks. The support tray 5 or support element has a funnel-shaped support area 21 for the respective glass to be frozen or cooled.

Preferably, the funnel-shaped support area 21 has small openings. Preferably, the funnel-shaped support area 21 has an elastic surface.

The support tray 5 or support element preferably comprises a supporting element 22, which is attached to the assembly bearing the nozzle 6 beneath the nozzle 6. The supporting element 22 has in the lower, inner area of the funnel-shaped support area 21 openings 23, through which pressure and snow-like dry ice may escape downward from the inside of the glass into the device interior. As shown, for example, the supporting element 22 may comprise multiple rods 24 arranged like spokes, which are connected by an inner ring 25 in the center and connected by an outer ring 26 outside. The outer ring 26 is preferably made to be funnel-shaped, i.e., as a face inclining inwardly and downwardly. The inner ring 25 is arranged around the central line for carbon dioxide beneath the nozzle 6. The rods 24 that are arranged like spokes preferably run, starting from the inner ring 25, first obliquely outward and downward and then, with a knee, obliquely outward and upward. Alternatively, the supporting element 22 can also be formed out of an approximately frustoconical sheet metal or plastic sheet, which is provided with openings 23 in the lower area around the inner ring.

Preferably, a funnel-shaped support 27, which is preferably formed out of silicone or another elastic material, is present on the supporting element 22. For better identification of the parts lying beneath, the funnel-shaped support 27 is shown transparent and dotted in FIG. 13. The funnel shape allows glasses of varying diameters to be pressed against the funnel-shaped support 27. Good sealing between glass rim and support 27 is achieved due to the elastic material. The funnel-shaped support 27 may be present as a silicone support 17, or the silicone support 17 may be made to be funnel-shaped.

The funnel-shaped support 27 is preferably supported on the supporting element 22 loosely, i.e., removably. Less preferably, the support 27 may also be firmly connected to the supporting element 22 or be present as a coating of the supporting element 22.

The nozzle 6 is preferably made to be conical, in particular pyramid-shaped or cone-shaped, so that snow-like dry ice slides off it obliquely downward. The lower face of the nozzle 6 is preferably made to be at least the same size as the upper face of the inner ring 25 of the supporting element 22. Various nozzles 6, differing in height, are shown in FIGS. 12 and 13. The nozzle 6 is preferably made to be removably, in particular unscrewable.

Snow-like dry ice finds its way down into the device interior between the funnel-shaped support 27 and the nozzle 6 and is preferably collected in a dry ice drawer 13 or another containment.

The executions of the support tray 5 or the support element and the funnel-shaped support 27 described with respect to FIGS. 12 and 13 may replace the support tray 5 of any of the variant embodiments described with respect to FIGS. 1 through 10. Preferably, the components described with respect to FIGS. 12 and 13, support tray 5 and funnel-shaped support 27, replace the components support tray 5 and silicone support 17 of FIGS. 4 through 10.

Figure 11:
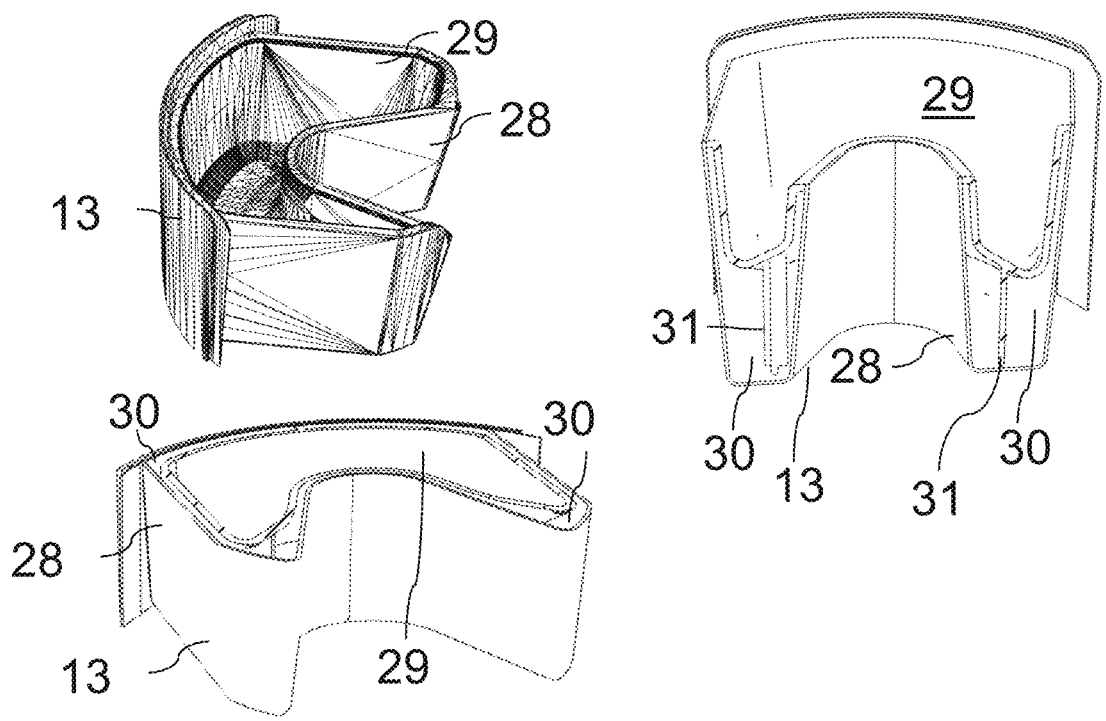
FIG. 11: shows a preferred design of a double-walled dry ice drawer.

Irrespective of the above variant embodiment, it is preferred for the dry ice drawer 13 to be present double-walled, as illustrated in FIG. 11 based on a wire model and two sectional views. Preferably, the dry ice drawer 14 has an outer wall 28 and an inner wall 29, wherein a cavity 30 is present between the walls. Preferably, the inner wall 29 and the outer wall 28 are connected on the upper rim. Supporting elements 31 may also run between inner wall 29 and outer wall 28. The cavity 30 lies all around the inner wall 29, i.e., including the area of the aperture of the dry ice drawer and beneath the bottom of the inner wall 29. The inner wall 29 has an inner container bottom, and the outer wall 28 has a lower, outer container bottom, between which the cavity 30 is present.

Thermal isolation material, air or a vacuum may be present inside the double wall, i.e., in the cavity 30. Alternatively, it is possible to provide the inner space of the dry ice drawer 13 with a thermal isolating material.

In a variant embodiment not shown, turbulence structures, which prevent the snow-like dry ice to swirl upward on the inner wall 2, are arranged beneath the support element or support tray 5.

In a variant embodiment not shown, the snow-like dry ice is prevented from exiting through the openings of the inner wall 2 by the sound-absorbing material 3 abutting the inner wall 2 on its outside.

A sealing may be arranged between the dry ice drawer 13 and the housing, in particular the outer wall 1, in particular in the area of the aperture of the dry ice drawer 13.

Figure 17:
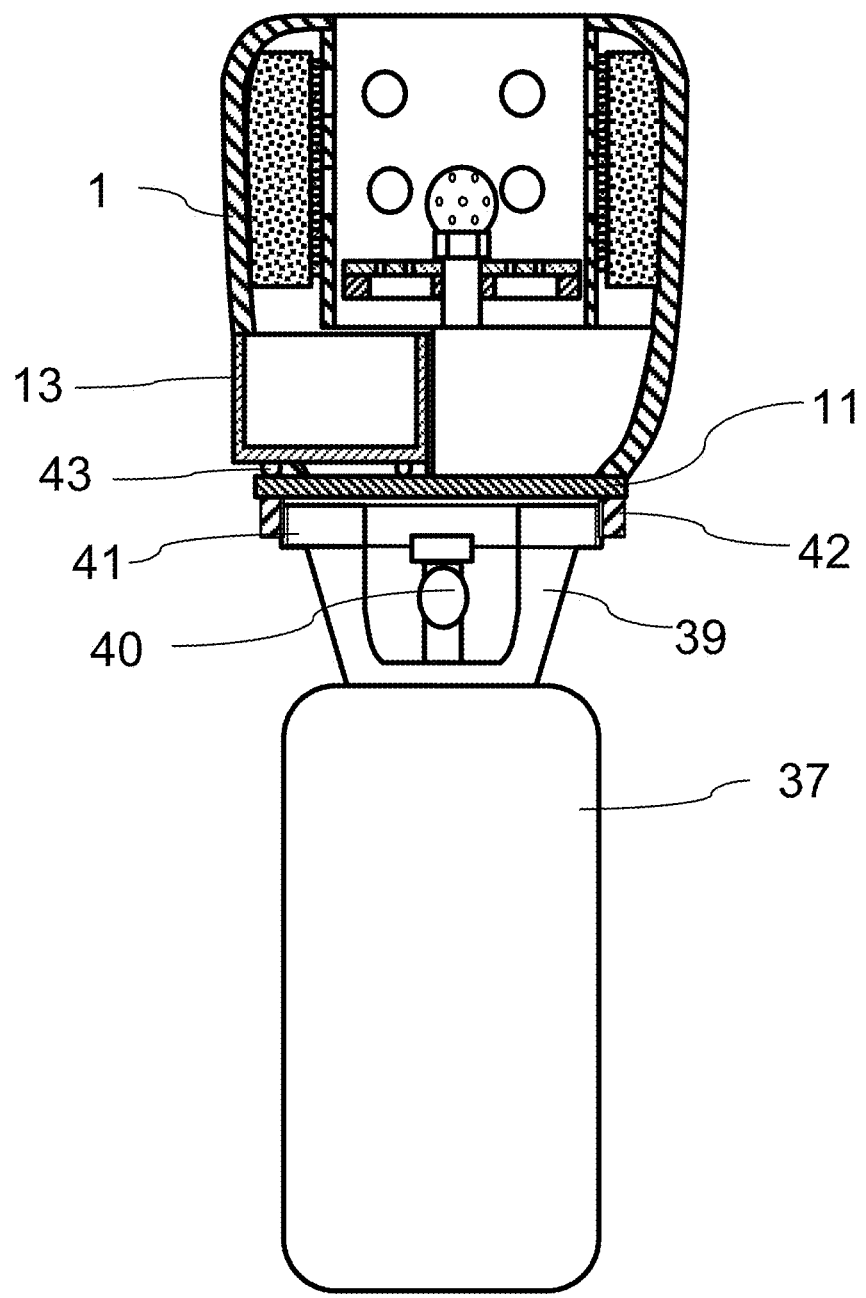
FIG. 17: illustrates a second exemplary variant for detachably attaching the device to the valve cap of a gas cylinder.

As illustrated in FIG. 17, multiple spacers 43, which cause support of the dry ice drawer 13 on a small surface area of the bottom element 11, may be arranged between the dry ice drawer 13 and the bottom element 11. The spacers 43 may be present on the dry ice drawer 13 or on the bottom element 11. Warmer ambient air may penetrate into the resulting gap between the bottom element 11 and the dry ice drawer 13. The support on a small surface area and the gap may prevent the dry ice drawer 13 to freeze on the bottom element 11. Alternatively or additionally, the bottom element 11 may be heated or form a heat bridge to the environment to prevent ice from forming on the upper side of the bottom element 11. For this, the bottom element 11 may, for example, be formed out of good heat-conducting material such as a metal.

In another variant embodiment, the bottom element 11 can be provided with an opening or multiple openings in the area of the bottom of the dry ice drawer 13. This allows ambient air to heat the area beneath the dry ice drawer 13. Also, it makes this area accessible from beneath through the opening, so that ice may be removed mechanically or by hot air, if necessary.

The above measures may be combined with thermal isolation present between the lower outer face of the dry ice drawer 13 and its inner container bottom (in particular the bottom of the inner wall 29).

Figure 14:
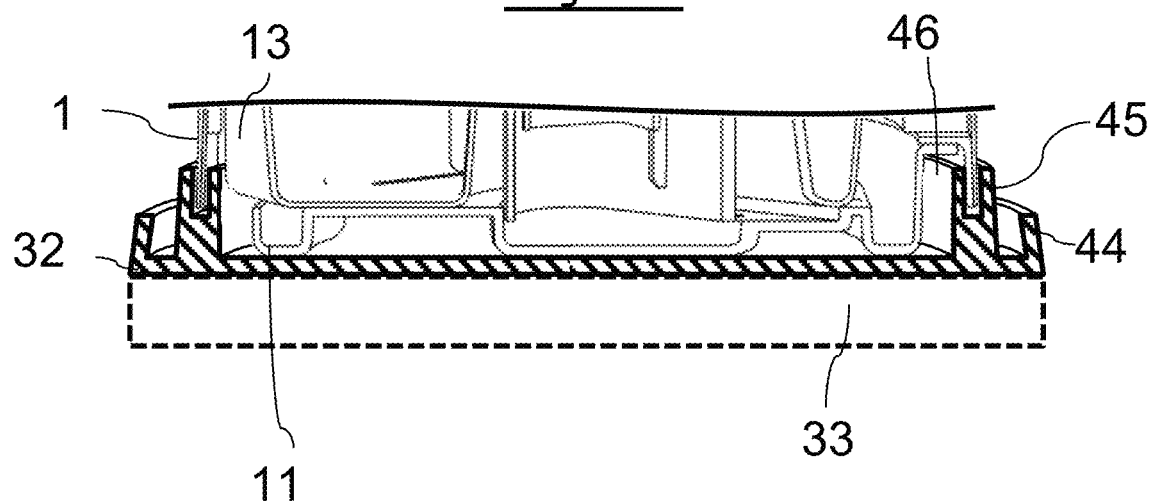
FIG. 14: illustrates a draining element.

FIG. 14 shows an optional draining element 32 which can be employed on device for cooling or freezing glasses. Preferably, the draining element 32 has on its outer circumference or its outer periphery an elevated web 44, so that condensed water draining from the outer wall 1 of the housing of the device is collected in a recessed area of the draining element 32 within the web 44. The web 44 may in one variant have at least one opening or disruption to be able to divert water at one site in a targeted manner, for example, towards a drain of a sink. Preferably, spaced apart from said outer web 44, the draining element 32 has a second inner web 45, which is higher than the outer web. The inner web 45 preferably lies on the outside of the outer wall 1 of the housing of the device. However, the inner web 45 may also, inside, abut a freely protruding lower rim area of the outer wall 1 inside.

Preferably, the draining element 32 has two inner webs 45, 46, between which a gap for receiving a section of the outer wall 1 of the device is present. Said section of the outer wall 1 is preferably formed by a freely protruding lower rim of the outer wall 1. Said rim has a distance from the inner housing components, the dry ice drawer 13 and/or the lower bottom element 11.

Preferably, the draining element 32 is closed beneath the bottom element 11 of the device.

The one or more inner webs 45, 46 may have at least one opening for liquid from beneath the device to be able to reach the recess lying between the outer web 44 and the outer wall 1. This opening may be at a height above the upper rim of the outer web 44.

The draining element 32 may have at least one opening as a passage for a connecting cable and/or gas line.

If the device has a dry ice drawer 13, the inner webs 45, 46 of the draining element 32 may have an exposure in the area of the dry ice drawer 13. The upper rim of the outer web 44 lies preferably at a height beneath the lower end of the dry ice drawer 13.

Preferably, the draining element 32 is formed out of elastic material, in particular rubber or silicone.

As illustrated in FIG. 14, the device may have a battery pack. The battery pack is preferably accommodated in a separate battery pack element 33. The battery pack element 33 preferably lies beneath the bottom element 11 of the device housing. Preferably, thermal isolation is present between the battery pack element 33 and the bottom element 11 and/or between the bottom element 11 and the dry ice drawer 13. As shown, the battery pack element 33 may be present beneath a draining element 32. The battery pack element 33 may also be present inside the draining element 32. The battery pack element 33 may also be integrated into the material of the draining element 32.

The battery pack element 33 and the draining element 32 may be firmly or detachably connected. Connection of the batter pack and the device may be via a cable, which is preferably connectable to the battery back and the device using a respective plug connection. A USB cable would be suitable, for example. Alternatively, the housing of the device may have on its lower end a plug connection, which gets into conductive contact with a plug connection of the battery pack element 33 upon placing the device on the battery pack element 33. Such plug connections are known, for example, with water boilers. Alternatively, contactless power transfer between battery pack element 33 and the device may occur, in particular by inductive coupling. The thermal discharge of the battery pack element 33 may be used to heat the bottom plate 11 beneath the dry ice drawer 13. The battery pack, which is preferably formed out of multiple round cells, is preferably present water-tightly encapsulated in the battery pack element 33.

Figure 15:
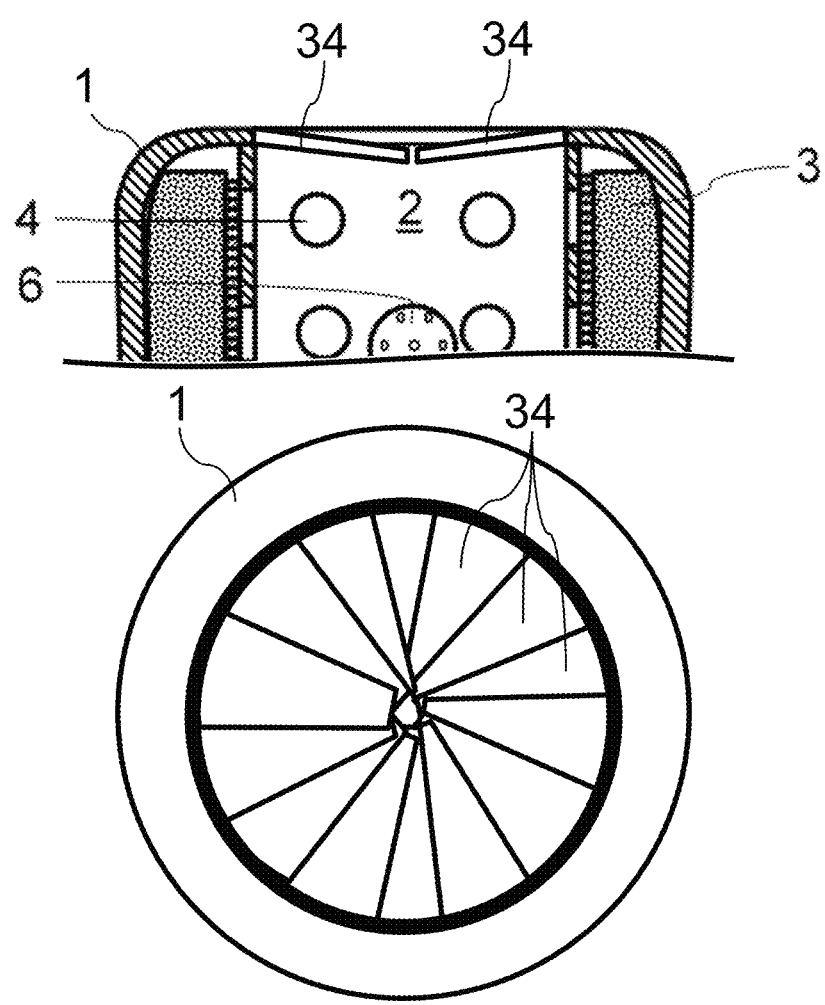
FIG. 15: illustrates a sealing element.

FIG. 15 schematically illustrates a device for cooling or freezing glasses with carbon dioxide, having an upwardly open inner space for receiving a glass, wherein the inner space is enclosed by an inner wall 2 all around, wherein a nozzle 6 and a support tray 5 are arranged in the inner space and a glass to be cooled or frozen is movable into the inner space and against the support tray 5 from above, whereby carbon dioxide is released from the nozzle 6 into the glass. It is proposed as an improvement to such device in the variant embodiment of FIG. 15 that at least one sealing element be present in the upper end region of the inner space or above the inner space, which sealing element at least partly seals off the inner space from above. It is thereby achieved that cold escapes less fast from the inner space, so that the consumption of carbon dioxide may be reduced.

Preferably, the seal or sealing element is formed out of a plurality of flexible elements which extend from the inner wall 2 towards the center of the inner space. As illustrated in FIG. 15, said flexible elements may be planar lamellas 34. As illustrated schematically, the adjoining lamellas 34 may partly overlap. Alternatively, the lamellas 34 may also be formed by cuts into a disc, in particular rubber disc, and thus be present without overlapping. The flexible elements may, for example, be present in the shape of bristles or plastic filaments.

In their initial state, the flexible elements extend approximately horizontally towards the center of the inner space and may be deformed downward by a glass, so that the glass may penetrated downward to the support tray 5 between the flexible elements.

Elements fastened to the housing via a joint may also be provided as flexible elements, wherein the joint is biased such that the elements are arranged at least approximately horizontally in their initial state.

The flexible elements have the advantage that the opening and closing of the inner space may occur without additional handling.

Less preferably, a removable lid may be present, which is either loose or fastened to the housing via a hinge joint.

Furthermore, at least one slider guided in a guide of the housing could be present above the inner space. Two sliding elements each closing half of the inner space are also contemplated.

A further possibility is an iris diaphragm or an iris valve. The slider(s) or an iris diaphragm or iris valve may be provided with an electric drive, so that the inner space is automatically opened by the device when a glass approaches. For this, the device is preferably provided with a sensor that detects the approach of a glass or object. For example, ultrasonic sensors are suitable.

Figure 16:
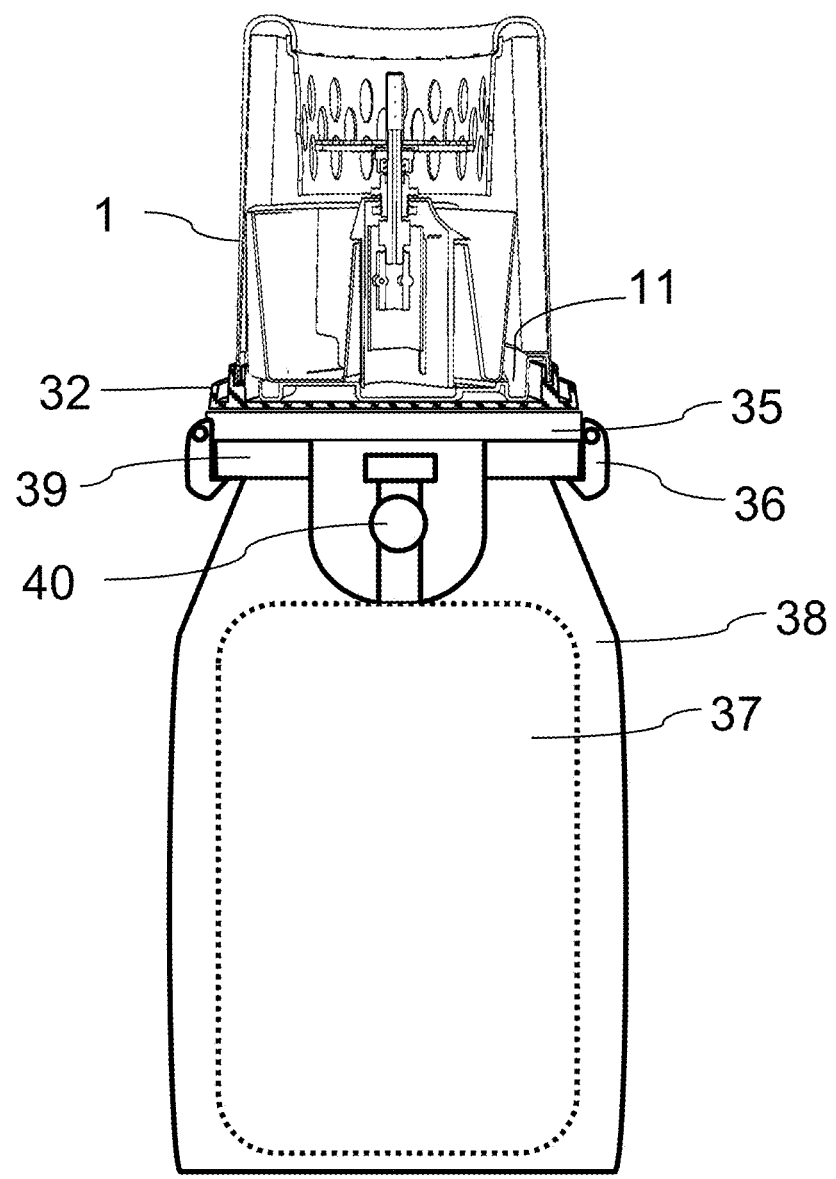
FIG. 16: illustrates a first exemplary variant for detachably attaching the device to the valve cap of a gas cylinder.
Figure 18:
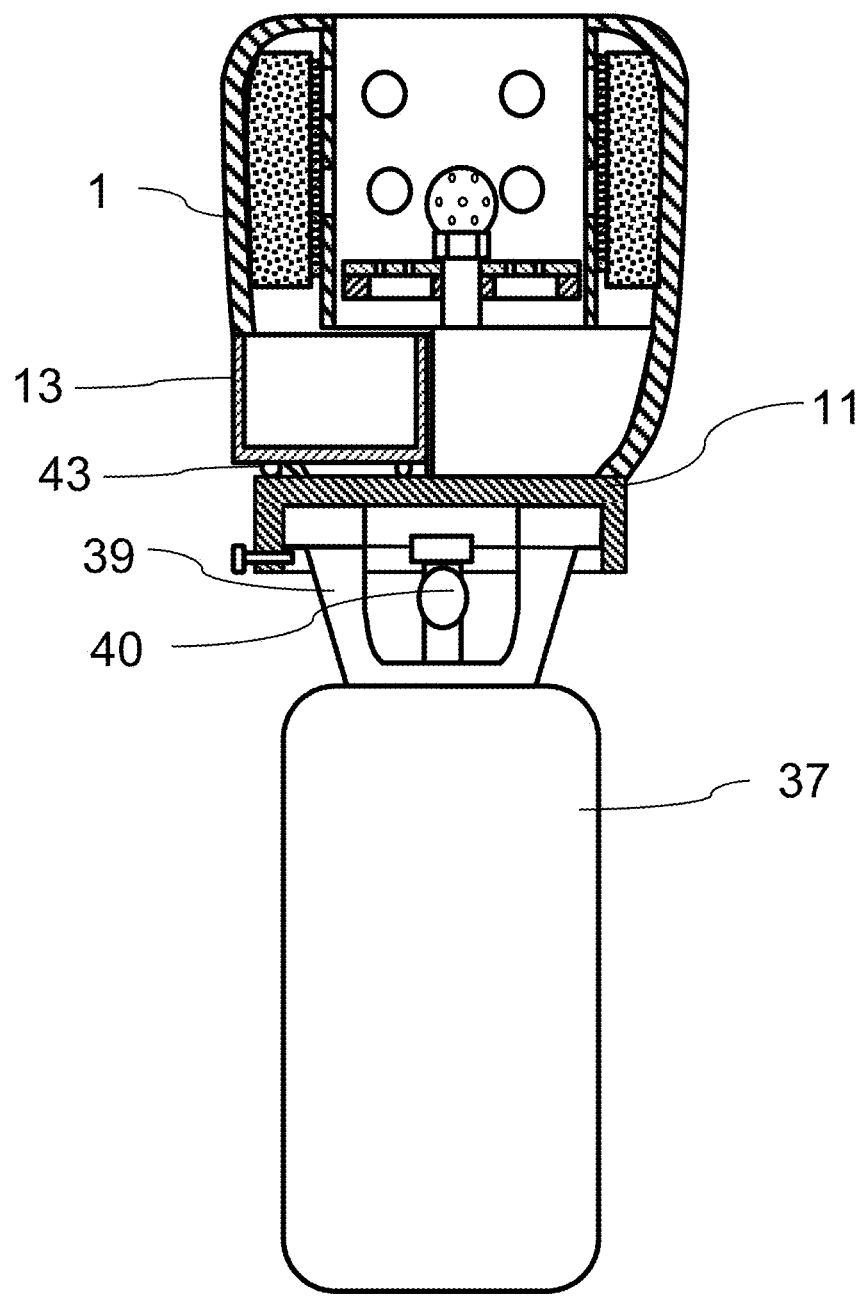
FIG. 18: illustrates a third exemplary variant for detachably attaching the device to the valve cap of a gas cylinder.

Further variant embodiments of devices for cooling or freezing glasses with carbon dioxide are shown in FIGS. 16, 17 and 18. Said variants are defined by the device being mounted or mountable to a containment for providing carbon dioxide. The containment for providing carbon dioxide has a gas cylinder 37 having on its upper end a valve on which a line, in particular in the shape of a tube, may be connected. Moreover, the containment has a valve cap 39 which protrudes above the valve 40 and surrounds the valve 40 at least in a partial area in a protective manner. Mostly, the valve cap 39 has an upper arcuate rim area. Said rim area may be widened towards the outside. The valve cap 39 may have openings beneath the rim area. Both measures serve for the valve cap to be able to also act as a carrying aid.

As illustrated in FIG. 16, the valve cap 39 may be part of a housing 38 which receives the entire gas cylinder 37 and thus also forms a bottom element. Said bottom element may optionally by provided with rollers and/or wheels in the context of the invention. This makes it particularly easy to transport or reposition the gas cylinder 37 including the device for cooling and freezing glasses.

As illustrated in FIG. 17, a valve cap 39 may be mounted to the upper end of the gas cylinder 37, in particular at the bottleneck beneath the valve 40.

The exemplary attachment variants of FIGS. 16, 17 and 18 are each suitable for both variants of valve cap 39.

The variant illustrated in FIG. 16 is suitable for attaching the device to a conventional valve cap 39 and/or a conventional carrying aid of a gas cylinder. The device is placed on top of the valve cap 39 and fastened to the valve cap 39 using fastening elements. For example, clamping elements 36 pivotably fastened to the device and encompassing the widened rim area of the valve cap 39 or engage with an opening of the valve cap 39 beneath its upper rim are suitable for this purpose.

The fastening elements in the shape of clamping elements 36 may be biased, so that they self-lock when the device is placed on top of the valve cap 39.

Less preferably, the device may also be fastened to the valve cap using fastening elements in the shape of at least a belt, using straps, buckles or strings.

The fastening element may attach to the bottom element 11 or to the outer wall 1.

As shown in FIG. 16, the connection may also be via an intermediate element 35 which serves as an adapter between the gas cylinder 37 and a device of FIGS. 1-15, which may thereby be selectively either placed on a gas cylinder 37 or be free-standing on an area of, e.g., a table or bar.

The intermediate element 35 may have a draining element 32 which is preferably executed according to FIG. 14. The device is preferably pluggable into the draining element 32 with its housing. Preferably, the draining element 32 is formed out of elastic material, in particular rubber or silicone. A battery pack may be accommodated in the intermediate element 35 or in the draining element 32.

In a variant not shown, the bottom of the device or the intermediate element 35 may have a recess for receiving the upper rim of the valve cap 39. The valve cap 39 may be held in said recess by clamping action, for example, by press fit.

As illustrated in FIG. 18, in one variant embodiment, the bottom plate 11 or else the outer wall 1 or an intermediate element 35 may protrude as far as beneath the upper rim of the valve cap. Preferably, at least one securing element preventing the device from taking off is present beneath the valve cap 39. The securing element may, for example, be a biased bolt on the housing of the device or on the intermediate element 35, which may be drawn outside from the position shown in FIG. 18 against a spring force. In a secured state, the securing element protrudes into the area beneath a widened upper rim of the valve cap 39 or into an opening in the valve cap 39. Multiple securing elements may be present distributed around the circumference of the device or intermediate element 35.

The device or intermediate element 35 may be adapted to a valve cap 39 of one or more suppliers of carbon dioxide cylinders.

Alternatively, a special valve cap 39, which is adapted to the device, as illustrated in FIG. 17, may be attached to the gas cylinder 37. This example valve cap 39 has on its upper end a connecting element 41, which is present as a counterpart of a connecting element 42 on the device. FIG. 17 illustrates that the connecting element 41 of the valve cap 39 may have a thread, for example as an outer thread, and the device or an intermediate element 35 may have a connecting element 42, also in the shape of a thread, for example an inner thread. Alternatively, the connection may be via a bayonet mount or with one of the fastening elements mentioned further above.

In addition to the FIGS. 16 through 18, a further outer housing, which protrudes all the way up to the device or intermediate element 35, could be arranged around the gas cylinder 37, to protect the cylinder on the one hand and also for optical reasons on the other. The outer housing may be present in the shape of a pedestal or column and be equipped with rollers or wheels on its lower end. A battery pack for the device may be present inside said outer housing.

In the variant embodiments of FIGS. 16-18, the device is connected to the valve of the gas cylinder using a short line, in particular a tube line. The line may run through the bottom element 11 or the outer wall 1, or through a gap between those elements.

The fact that the gas cylinder 37 and the device mounted thereon form a releasable unit reduces the space required, with the releasable connection allowing easy replacement of the gas cylinder 37.

To replace the gas cylinder 37, the line leading to the device is detached from the valve of the gas cylinder 37 and the device is detached from and/or taken off the valve cap 39. The gas cylinder 37 including the valve cap 39 is removed and replaced by a full gas cylinder 37 including valve cap 39. The device is placed on the valve cap 39 of the full gas cylinder 37 and the line leading to the device is connected to the valve 40 of the full gas cylinder 37.

It should be understood that the variants 16 through 18 are independent of the design of the device in the area above the intermediate element 35 or the lower, outer housing area having the at last one fastening element. It is thus possible in the context of the invention to provide a device for freezing or cooling glasses known in prior art with fasteners or an intermediate element 35. Likewise, a known device may be provided with a draining element 32 and/or a sealing element in the context of the invention.

However, the device of the embodiments of FIG. 14-18 is preferably executed according to any of the embodiments described with regard to FIGS. 1-13 and/or is equipped with any one or more of the features illustrated herein.

The invention claimed is:

1. A device for cooling or freezing glasses with carbon dioxide, comprising:
    an upwardly open inner space for receiving a glass, the inner space being enclosed all around by an inner wall;
    a nozzle and a support tray arranged in the inner space, the glass to be cooled or frozen being movable into the inner space and against the support tray from above, the nozzle being configured to release carbon dioxide into the glass; and
    an outer wall;
    wherein the outer wall the outer wall and the inner wall are connected on an upper end of the device;
    wherein the inner wall is open towards device interior beneath the support tray or is sealed with an inner bottom element having multiple openings leading into the device interior;
    wherein a container is arranged beneath the support tray in the device interior;
    wherein dry ice developing at the nozzle descends downward from an inside of the glass into the container through openings of the support tray or through openings between the support tray and the nozzle; and
    wherein the container is removable from the device.

2. The device as claimed in claim 1, wherein:
    the container comprises a drawer.

3. The device as claimed in claim 1, wherein:
    the inner wall has openings leading into the device interior between the inner wall and the outer wall; and
    a sound-absorbing material is present in a cavity between the inner wall and the outer wall.

4. The device as claimed in claim 3, wherein the openings of the inner wall lead from the inner space to the sound-absorbing material.

5. The device as claimed in claim 1, wherein:
    the support tray comprises an elastic material.

6. The device as claimed in claim 1, wherein the outer wall is sealed by a lower bottom element, which is detachably connected to the outer wall.

7. The device as claimed in claim 1, wherein the outer wall and the inner wall are undetachably connected on the upper end of the device.

8. The device as claimed in claim 1, further comprising one of:
    a sensor configured to detect a glass being pressed against the support tray; and
    a switch or button configured to be actuated when pressing a glass against the support tray;

wherein the device has a valve for releasing carbon dioxide via the nozzle, which valve is opened based on a signal of the sensor or based on the actuation of the switch or button.

9. The device as claimed in claim 8, wherein the sensor or switch and the valve are separated by a screen.

10. The device as claimed in claim 8, wherein:
the device has an inner housing in which the valve and the sensor or switch are arranged; and
the inner housing comprises a roof and a wall;
the roof has a roof protrusion with regard to the wall; and
part of a container wall of the container lies beneath the roof protrusion of the inner housing.

11. The device as claimed in claim 10, wherein the container has two areas laterally encompassing the inner housing and the container is a drawer and can be laterally removed from and reinserted into the device through an opening of the outer wall, or the container is accessible through a sealable opening of the outer wall.

12. The device as claimed in claim 1, wherein the support tray has a funnel-shaped support area for the glass and dry ice developing at the nozzle can get down into the device interior through openings which are present between the funnel-shaped support area of the support tray and the nozzle.

13. The device as claimed in claim 1, wherein at least one sealing element, which at least partly seals off the inner space from above, is present at the upper end region of the inner space or above the inner space.

14. The device as claimed in claim 13, wherein the at least one sealing element is formed by a plurality of flexible elements which extend from the inner wall towards the center of the inner space.

15. The device as claimed in claim 1, wherein the device has on its lower end a fastener with which the device is detachably mountable on a valve cap of a gas cylinder, wherein the fastener is present on a housing of the device or on an intermediate element which is detachably connected to the housing of the device.

16. The device as claimed in claim 1, wherein the device for cooling or freezing glasses stands on a draining element, wherein the draining element has on its outer circumference or in its outer periphery an outer web, and a recess is present between a housing of the device and the outer web.

17. The device as claimed in claim 16, wherein the draining element has two inner webs, between which a gap for receiving a section of an outer wall of the device is present.

18. A device for cooling or freezing glasses with carbon dioxide, comprising:
an upwardly open inner space for receiving a glass, the inner space being enclosed all around by an inner wall;
a nozzle and a support tray arranged in the inner space, the glass to be cooled or frozen being movable into the inner space and against the support tray from above, the nozzle being configured to release carbon dioxide into the glass;
an outer wall, wherein the outer wall and the inner wall are connected on the upper end of the device;
a lower bottom element, which closes the outer wall at a lower end of the device; and
at least one fastening element on the lower end of the device, the at least one fastening element configured to detachably mount the device on a valve cap of a gas cylinder;
wherein the fastening element is present on a housing of the device or on an intermediate element which is detachably connected to said housing of the device.

19. The device as claimed in claim 18, wherein at least one fastening element is selected from the group of fastening elements:
clamping element encompassing an upper periphery of the valve cap, belt, strap, buckle, string, screw, bolt, thread, protrusions or recesses of a bayonet mount, and recess for receiving the upper rim of the valve cap.

20. An apparatus comprising:
a device for cooling or freezing glasses with carbon dioxide, a gas cylinder and a valve cap fastened to the gas cylinder;
wherein the device for cooling or freezing glasses is detachably fastened to the valve cap;
wherein device for cooling or freezing glasses with carbon dioxide comprises:
an upwardly open inner space for receiving a glass, the inner space being enclosed all around by an inner wall;
a nozzle and a support tray arranged in the inner space, the glass to be cooled or frozen being movable into the inner space and against the support tray from above, the nozzle being configured to release carbon dioxide into the glass;
an outer wall, wherein the outer wall and the inner wall are connected on the upper end of the device, and
a lower bottom element closing the outer wall at a lower end of the device.

* * * * *